P. J. ZIER.

Improvement in Apparatus for Shafting Belts on Pulleys.

No. 123,543.

Patented Feb. 6, 1872.

Witnesses:
Parker H. Sweet, Jr.
J. C. Wildman

Inventor:
Peter J. Zier
By J. S. Johnston & Bro.
his attorneys

123,543

UNITED STATES PATENT OFFICE.

PETER J. ZIER, OF PITTSBURG, PENNSYLVANIA.

IMPROVEMENT IN APPARATUS FOR SHIFTING BELTS ON PULLEYS.

Specification forming part of Letters Patent No. 123,543, dated February 6, 1872.

*To all whom it may concern:*

Be it known that I, PETER J. ZIER, of Pittsburg, in the county of Allegheny and State of Pennsylvania, have invented a certain new and useful Improvement in Apparatus for Shifting Belts on Pulleys; and I do hereby declare that the following is a full, clear, and exact description thereof, reference being had to the accompanying drawing and to the letters of reference marked thereon.

The nature of my invention consists in an arrangement of the "loose pulley" with relation to the "tight pulley" on the main or driving-shaft for machinery, whereby the belt-gear and "loose pulley" on the said main or driving-shaft, and the driven shaft will remain at rest while the main or driving-shaft continues its motion, the whole being under the control of the operator.

To enable others skilled in the art to make and use my invention, I will proceed to describe its construction and operation.

Figure 1:
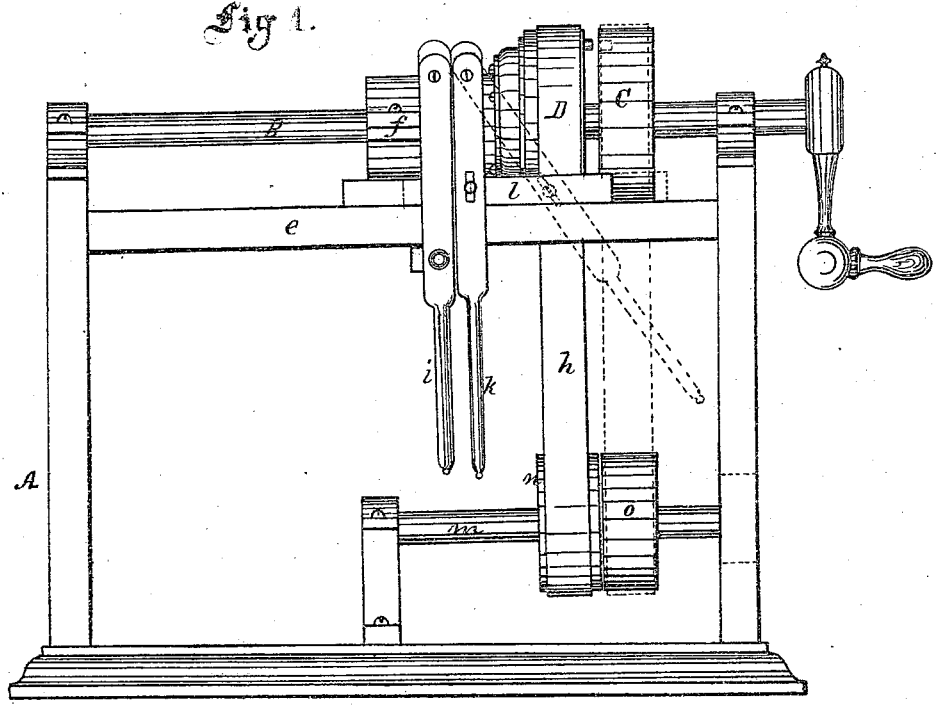
Figure 2:
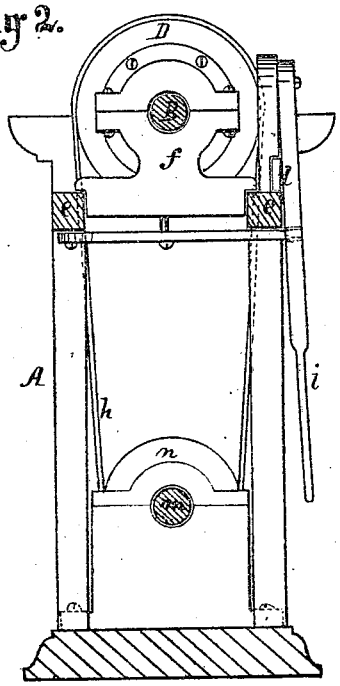

In the accompanying drawing which forms part of my specification, Figure 1 is a side elevation of my improvement in apparatus for shifting belts used for lathes, &c. Fig. 2 is a side elevation of the same.

In the accompanying drawing, A represents the frame-work. B represents the main or driving-shaft. C represents the "tight pulley;" and D the loose pulley of the main-shaft. On the timbers or guides e is arranged a bearing or axis, f, on one end of which is pivoted the loose pulley D, the inner face of which is provided with two projecting pins which are fitted to openings in the side of the "tight pulley" C. The bearing or axis f of the loose pulley D, is moved from or coupled with the tight pulley by moving the bearing or axis f on the guides e through the medium of the hand-lever i. The belt h is shifted through the medium of the lever k and carrier l. The shaft m and the pulleys n and o represent the driven shaft and its pulley for a lathe or other machine. When it is desirable to shift the belt h from the tight pulleys C and o upon the loose pulleys D and n, the bearing or axis f is moved through the medium of the hand-lever i so as to couple the loose pulley D with the tight pulley C; then by shifting the carrier l through the medium of the lever k, the belt h will be shifted upon the loose pulleys D and n; then the bearing f is shifted back, carrying the pulley D with it, whereby the loose pulleys, belt, and driven shaft are brought to a state of rest. The belt is shifted upon the tight pulleys by moving the bearing f towards the tight pulley C until it and the loose pulley D are coupled; then the carrier l is shifted so as to bring the belt upon the tight pulleys C and o.

By the arrangement herein described for shifting the belt, accidents to both the operator and the machinery driven will be avoided, and the slipping and tearing of belts be prevented.

What I claim is—

The loose pulley D of the driving shaft B, combined with a bearing f, which is independent of the said driving-shaft, as herein described, and for the purpose set forth.

P. J. ZIER.

Witnesses:
A. C. JOHNSTON,
JAMES J. JOHNSTON.